United States Patent [19]

Bang et al.

[11] 4,286,618

[45] Sep. 1, 1981

[54] VALVE

[75] Inventors: Chang Bang, Stone Mountain; Scott Row, Marietta, both of Ga.

[73] Assignee: Korus, Inc., Atlanta, Ga.

[21] Appl. No.: 148,131

[22] Filed: May 9, 1980

[51] Int. Cl.³ .......................... F16K 21/04; A01K 7/02
[52] U.S. Cl. ..................................... 137/408; 119/81; 137/446; 137/451; 251/7
[58] Field of Search ................. 119/81; 137/403, 404, 137/408, 446, 451; 251/7, 9, 61.1

[56] References Cited

U.S. PATENT DOCUMENTS

| 430,968 | 6/1890 | Minor | 137/451 |
|---|---|---|---|
| 2,634,755 | 4/1953 | Hobbs | 137/698 |
| 2,800,917 | 7/1957 | Hoffmeister | 137/408 |
| 2,831,497 | 4/1958 | Skerritt | 137/451 |
| 2,868,222 | 1/1959 | Robinson | 137/408 |
| 3,090,399 | 5/1963 | Godshalk | 137/614.14 |
| 3,220,652 | 11/1965 | Cape | 251/7 |
| 3,333,575 | 8/1967 | Spencer | 137/408 |
| 3,335,753 | 8/1967 | Kiser | 251/9 |
| 3,384,336 | 5/1968 | Pulman | 251/9 |
| 3,508,574 | 4/1970 | Skerritt | 137/451 |

*Primary Examiner*—Martin P. Schwadron
*Assistant Examiner*—G. L. Walton
*Attorney, Agent, or Firm*—Jones, Thomas & Askew

[57] ABSTRACT

A water control valve particularly suited for use with poultry watering apparatus having a deformable rubber sleeve lining the interior of the valve housing. A pair of piston members are arranged to pinch the sleeve and thus cut off the flow through the valve in response to a cross member attached to a control lever alternately urging each of the pistons into the housing.

1 Claim, 5 Drawing Figures

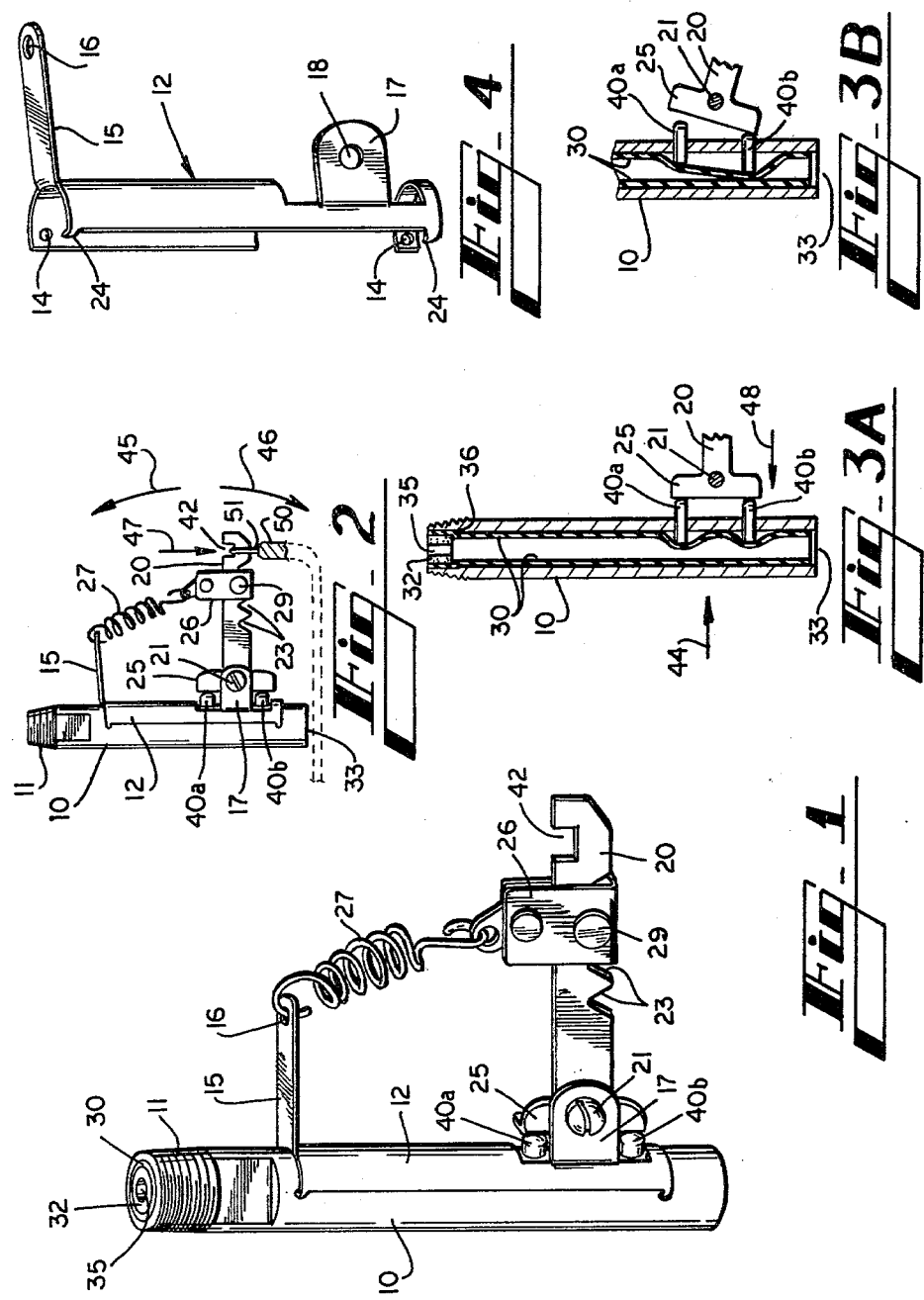

VALVE

TECHNICAL FIELD

The present invention relates to water valves and particularly to automatic valves for use in poultry watering apparatus.

BACKGROUND OF THE INVENTION

In the raising of poultry it is common to use elongated watering troughs which are fed by automatic water feed valves. Generally a watering trough for poultry will be an elongated channel pivotally attached at one end to a wall or other rigid support and having a second end attached to a control lever for an automatic valve. The valve attached to the control lever is responsive to the weight of the water in the trough and will automatically replenish the supply as it is lost through drinking by the poultry or evaporation into the air. When a sufficient amount of water is in the trough, the weight of the trough as applied to the control lever of the valve will cause the valve to shut off the supply of water.

As is known to those skilled in the art, it is also desirable to have the control valve cut off to flow when the trough is removed so that removal of the trough will not cause water to be spilled onto the floor of the poultry house.

The general arrangement for valves for poultry watering troughs is well known in the art. For example, U.S. Pat. No. 2,800,917 to Hoffmeister, U.S. Pat. No. 2,634,755 to Hobbs, and U.S. Pat. No. 3,090,399 to Godshalk all show various species of control valve for poultry watering apparatus. The valves described in these patents all include a spring biased lever which will bias a valve operating mechanism shut when the weight of the water trough is removed from the control lever. Each of the biasing springs may be adjusted to control the total force applied by the watering trough which will shut off the valve when the lever is urged downward by the weight of the trough and the water.

Prior art water control valves of the type shown in the above-referenced patents all include a pair of weighted members attached to each other by a pin passing through a bore in the interior of the valve housing. The pin is longer than the length of the bore. Therefore the basic arrangement takes on the appearance of a barbell having the bar passing through a bored out portion in the interior of the valve housing. On both the upper and lower sides of the bore a valve seat is provided so that when the upper weight is seated on top of the bore, flow of water through the valve housing is terminated. Similarly when the lower weight is urged upward against the lower valve seat, the water flow is also terminated.

When the force urging the weights upward which comes from the weight of the trough at a support location working against the spring bias on a lever arm is substantially cancelled by the force of the water pressure in a feed line, neither weight will be seated in one of the valve seats and water will flow through the valve.

There are two main disadvantages to prior art watering valves of the type described above. The first disadvantage is that construction of such valves requires a relatively large number of machined metal parts, particularly the valve seats and the arrangement of weights and the pin or bar passing through the bore running between the seats.

The second main disadvantage of prior art watering valves, as will be appreciated from inspection of the above-referenced patents, is that it is relatively common for particulate matter to collect between the walls of the bore and the pin joining the valve weights which tends to clog the valve and prevent its proper operation. Adequate cleaning of a valve so clogged generally requires the removal thereof and a somewhat tedious cleaning process. It may require disassembly of the valve.

SUMMARY OF THE INVENTION

The present invention overcomes the above-referenced limitations of the prior art by providing a much simpler cut-off mechanism than the mechanisms of the prior art. Generally the present invention comprises a conventional valve housing which is bored out along its entire length and lined with a resilient deformable sleeve.

The control of the valve is provided through a basically conventional control lever having a support location for accepting a supporting member for the watering trough.

However, instead of having a dual seat valve for accepting a pair of valves spaced longitudinally along the longitudinal axis of the valve housing, the present invention simply provides apparatus for deforming and pinching off the flexible sleeve when the control lever is in the appropriate position. Preferably the sleeve comprises a section of synthetic rubber tubing with sufficient elasticity to resume its normal shape when not disturbed by the cut-off mechanism of the present invention. Of course any appropriately elastic material may be used for the sleeve.

A preferred form of the present invention uses a pair of piston members extending radially from the longitudinal axis of the valve housing. When the weight of the watering trough as applied at the support location is counterbalanced by the force provided by the biasing spring, the valve will be open since neither of the pistons will be in a position to close the flexible sleeve. When the force is removed from the support location, such as when the watering trough is removed for cleaning, the conventional spring bias on the control lever will cause one of the pistons to be forced into the valve housing pinching off the flexible sleeve and thus cutting off flow of water through the valve.

When the support location of the control lever has sufficient force applied thereto against the biasing spring, the other piston member will be urged against the sleeve with sufficient force to pinch off the flow of water and thus close the valve.

Therefore it is an object of the present invention to provide a water control valve of much simpler construction than prior art water control valves used in poultry watering apparatus.

It is further an object of the present invention to provide a water control valve which is not susceptible to clogging due to particulate matter in the water.

It is still a further object of the present invention to provide a water control valve for poultry watering apparatus or the like which will continually flush particulates and dirt from the flow path and thus prevent clogging of the valve.

It is still a further object of the present invention to provide a water control valve of simple construction which is less expensive than prior art valves and has fewer parts requiring close tolerance machining.

These and other objects of the present invention will become apparent from the detailed description of the preferred embodiment below.

BRIEF DESCRIPTION OF THE DRAWINGS

FIG. 1 is a pictorial view of the preferred embodiment of the present invention.

FIG. 2 is a side elevational view of the preferred embodiment of the present invention.

FIG. 3A is a side elevational cross section (without the lever holding bracket) taken along the longitudinal axis of the valve housing.

FIG. 3B is a partial side elevational cross sectional view of the preferred embodiment showing one of its cut-off positions.

FIG. 4 is a pictorial view of the lever bracket of the preferred embodiment.

DETAILED DESCRIPTION

The best mode of constructing and using the present invention presently known to the inventors is set forth in the specification and may be understood by reference to the figures in which like numerals reference like parts. Turning first to FIG. 1, it may be seen that the preferred embodiment comprises a valve housing 10 having a threaded portion 11 at the upper end thereof.

Attached to the valve housing is a control lever bracket 12, a pictorial view of which may be seen in FIG. 4. It may be seen that bracket 12 is a unitary element including a control lever support tab 17 having a role 18 provided therethrough. Spring holding tab 15 having a hole 16 for accepting one end of a spring also forms a part of bracket 12.

As shown in FIG. 1, bracket 12 is disposed around valve housing 10 by means of pins 24 and holes 14 which may accept screw, rivets or any other means for attaching bracket 12 to valve housing 10. It is to be understood that the particular arrangement of bracket 12 as a separate element of the entire improved valve of the present invention preferred and in no way limits the scope of the present invention to apparatus having unitary brackets such as bracket 12 shown in FIG. 4.

At the upper end of the valve a compressed flexible sleeve 30 is visible. The sleeve is held in place by a sleeve retaining member 32 having an annular orifice 35 therein.

A control lever 20 is pivotally attached to control lever support tab 17 by means of a screw 21 which also provides a fulcrum for lever 20. A bracket 26 for retaining one end of spring 27 is selectively adjustable by means of a knob 29 having a threaded member (not shown) through the bracket. It is to be understood that the threaded member attached to knob 29 may be selectively lodged in any of notches 23 disposed on the lower side of lever 20. It will be appreciated by those skilled in the art that the particular adjustment arrangement for bracket 26 is conventional in nature. In order to reduce cost it may be desirable to eliminate bracket 26 and directly place the lower end of spring 27 into one of notches 23 without departing from the scope of the present invention.

At the distal end of lever 20 is a notch 42 which comprises a support location for accepting a conventional hook 51 shown in FIG. 2 attached to a conventional watering trough 50 (shown in phantom in FIG. 2). It will be appreciated that trough 50 comprises a discharge container for accepting water or some other fluid passed through the valve of the present invention and therefore that notch 42 comprises a support location for supporting a discharge container.

Also visible in FIG. 2 are a pair of piston members 40a and 40b which extend through valve housing 10 into the interior of the preferred embodiment of the present invention.

It will be appreciated from FIG. 2 that attaching discharge container 50 to the distal end of lever 20 at support location 42 will cause a force in the direction of arrow 47 to be applied to lever 20 which tends to rotate lever 20 in the direction of arrow 46 around pivot screw 21. It will similarly be appreciated that spring 27 exerts an upward force on bracket 26 which tends to rotate lever 20 in the direction of arrow 45 about pivot screw 21. It will thus be appreciated that provision of downward force in the direction of arrow 47 from the weight of trough 50 and the water therein will act as a second class lever against the force provided by spring 27 to bracket 26. It will further be appreciated that this arrangement is conventional in nature.

Among the novel features of the preferred embodiment are piston members 40a and 40b which are visible in FIG. 2, and FIGS. 3A and 3B. The operation of the preferred embodiment may be best appreciated from FIGS. 3A and 3B.

In FIG. 3A it may be seen that the interior of valve housing 10 is lined with a selectively deformable cylindrically shaped sleeve 30 which, in the preferred embodiment, consists of a piece of synthetic rubber tubing. It will be appreciated that the preferred embodiment uses rubber tubing which is not only selectively deformable but which has sufficient elasticity to tend to resume its cylindrical shape in the absence of external pressures thereon.

At the top of valve housing 10 a seat 36 is provided into which annular retaining member 32 is forced compressing the upper portion of sleeve 30. In the preferred embodiment of the present invention annular retaining member 32 is constructed of Teflon brand synthetic resin polymers but any material of sufficient strength to compress sleeve 30 against seat 36 and the interior of valve housing 10 may be used. Annular retaining member 32 has an orifice 35 through the center thereof for allowing water to pass into the interior of valve housing 10.

Piston members 40a and 40b of the preferred embodiment are inserted through a pair of holes in valve housing 10 and the pistons extend radially from the longitudinal axis of the valve housing. Each of pistons 40a and 40b is urged against a cross member 25 attached to lever 20. In the preferred embodiment, cross member 25 and lever 20 are of unitary construction. It is to be understood that in the preferred embodiment deformable sleeve 30 is of sufficient elasticity to urge piston members 40a and 40b in the direction of arrow 44 so as to remain in contact with cross member 25.

in FIG. 3A, it may be seen that under a condition of substantial equilibrium between the force supplied by spring 27 and the gravitational force supplied in the direction of arrow 47 at support location 42 an open passageway exists between orifice 35 and discharge point 33 that will allow water to pass through the valve. Assume that a discharge container 50 is present under discharge opening 33 and that such a discharge container comprises a conventional poultry watering trough. As the trough fills with water it becomes heavier and a greater force is applied in the direction of arrow 47 (FIG. 2) tending to rotate lever 20 about pivot screw 21 in the direction of arrow 46 (FIG. 2).

When a predetermined force is provided at support location 42 in the direction of arrow 47 (FIG. 2) lower piston 40b will be forced into the interior of valve housing 10 in the direction of arrow 48 a sufficient distance to completely pinch off the path which previously existed through the interior of the valve. This condition is shown in FIG. 3B wherein cross member 25 has urged piston 40b a sufficient distance into the valve to deform and close the sleeve thus terminating the flow of water to discharge point 33. It will be appreciated that both water pressure from water entering orifice 35 and the elasticity of sleeve 30 will tend to urge piston 40b in the direction of arrow 44 and thus, when lever 20 is rotated in the direction of arrow 45 piston member 40b will tend to move out of the interior of the valve housing in the direction of arrow 44.

It will therefore be appreciated that the present invention comprises a selectively deformable sleeve 30 within valve housing 10 and has a lever 20 extending from valve housing 10 for supporting a discharge container 50 at a support location 42. It will be appreciated that the present invention further comprises a cut-off means coupled to lever 20 via cross member 25 for deforming and closing deformable sleeve 30 in response to a predetermined force in the direction of arrow 47 being applied at support location 42.

It will further be appreciated that piston 40b, lever 20 and cross member 25a in combination comprise a cut-off means having a piston member extending through valve housing 10 which is substantially perpendicular to the longitudinal axis of valve housing 10 and that cross member 25 urges piston member 40b into the interior or valve housing 10 in response to movement of support location 42 in the direction of arrow 46.

It will be apparent to those skilled in the art that piston 40a will similarly deform and close the deformable sleeve 30 when force is removed from port location 42 and bias spring 27 pulls lever 20 in the direction of arrow 45 tending to urge piston member 40a into the interior of valve housing 10 pinching off deformable sleeve 30.

It will therefore be appreciated that the machined metal parts of the preferred embodiment of the present invention are few and that the tolerances, most importantly the machining of piston members 40a and 40b and the holes in valve housing 10 which receive these members, are substantially noncritical. Furthermore there are no complicated machined parts in the interior of valve housing 10. It will also be appreciated that since seat 36 is designed to accept a compressed portion of sleeve 30 that the machined dimensions of this seat are noncritical. It will therefore be appreciated that the preferred embodiment of the present invention accomplishes the object set forth above of providing a simple and inexpensive automatic watering valve having a minimum of expensive finely machined parts.

It will also be appreciated particularly from FIGS. 3A and 3B that the width of the passage between orifice 35 and discharge point 33 expands and contracts as the valve is operated and therefore the valve will tend to flush out dirt and other particular matter which may be present in the water passing through the valve. This is to be contrasted with the constant clearance between the bore of the passageway and the pin holding the dual valves of prior art automatic watering valves and therefore tend to collect particulate matter of an appropriate size and thus tend to become clogged. Therefore the preferred embodiment of the present invention accomplishes the object set forth above of having a valve which tends to be flushed of dirt and other particulate matter. It will be appreciated that the present invention is of simple construction and provides an improved inexpensive poultry watering valve which is completely compatible with preexisting poultry watering equipment. It will further be appreciated that embodiments of the present invention other than the preferred embodiment shown herein may be constructed within the scope of the claims below.

We claim:

1. An improved liquid control valve comprising in combination:

a valve housing:

a selectively deformable sleeve within said valve housing;

means defining a first orifice and a second orifice extending from the outside to the interior of said valve housing, said first orifice and said second orifice characterized, respectively, by a first orifice longitudinal axis and a second orifice longitudinal axis, said first orifice longitudinal axis and said second orifice longitudinal axis being substantially perpendicular to the longitudinal axis of said valve housing;

first and second piston members for deforming said deformable sleeve and being slidably inserted, respectively, into said first orifice and said second orifice;

a lever means pivotally mounted externally to said valve housing about a lever axis extending between said first and second orifice longitudinal axes including a support location at a distal end for supporting a discharge container and a cross member at a near end extending substantially perpendicular to said lever axis, said first and second orifice longitudinal axes passing through said cross member:

said lever means being rotatable about said lever axis to an open position wherein said first and second piston members are urged equal distances into said valve housing; and biasing means coupled to said lever means for biasing said lever means toward a cutoff position at which said cross member urges said first piston member into said interior of said valve housing to deform and pinch off said deformable sleeve and at which said deformable sleeve urges said second piston member out of said valve housing toward said cross member.

* * * * *